May 5, 1942.  C. NICHOL  2,282,202
GROUND ENGAGING VEHICLE BRAKE
Filed Dec. 4, 1941  2 Sheets-Sheet 1
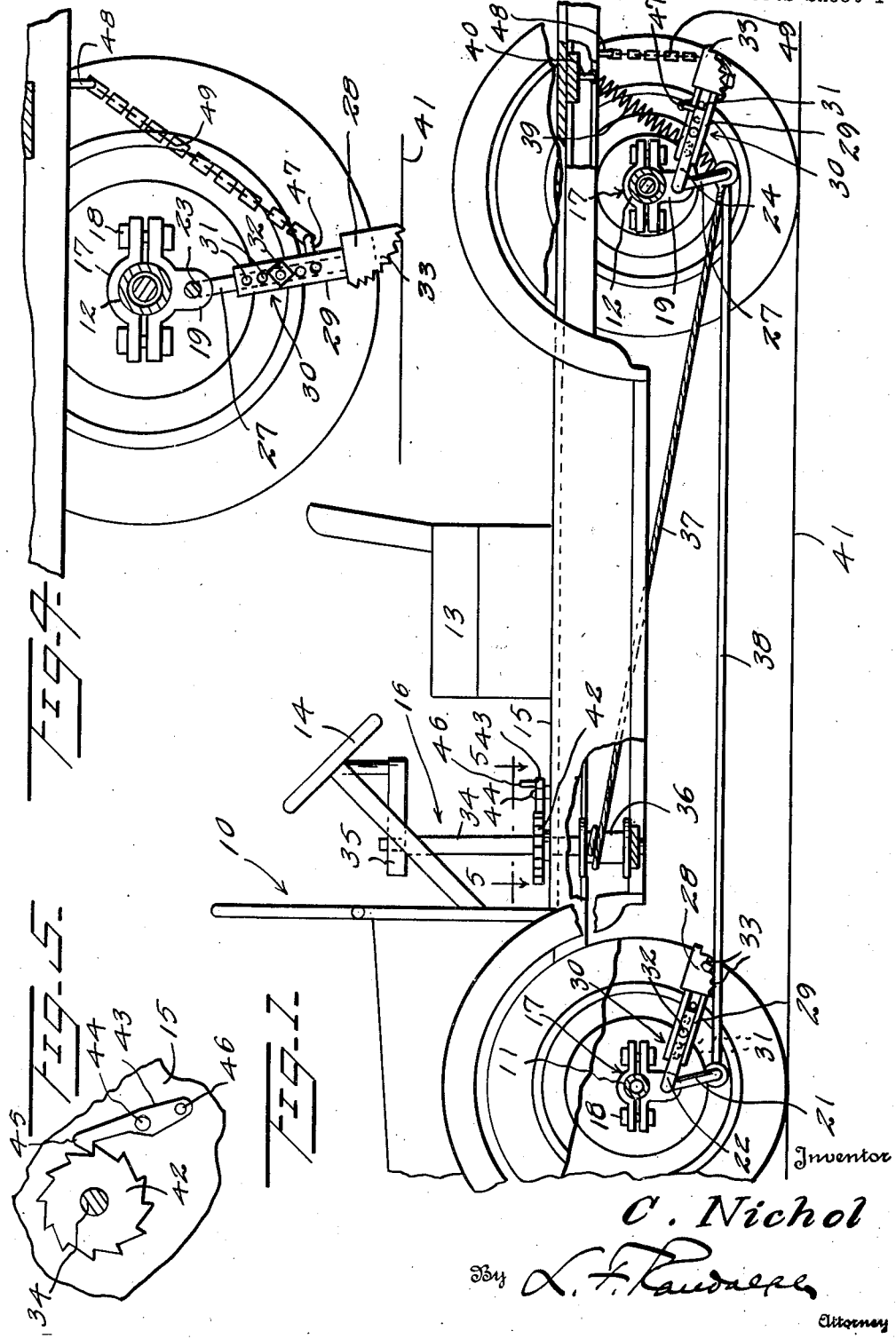
Inventor
C. Nichol May 5, 1942. C. NICHOL 2,282,202
GROUND ENGAGING VEHICLE BRAKE
Filed Dec. 4, 1941 2 Sheets-Sheet 2
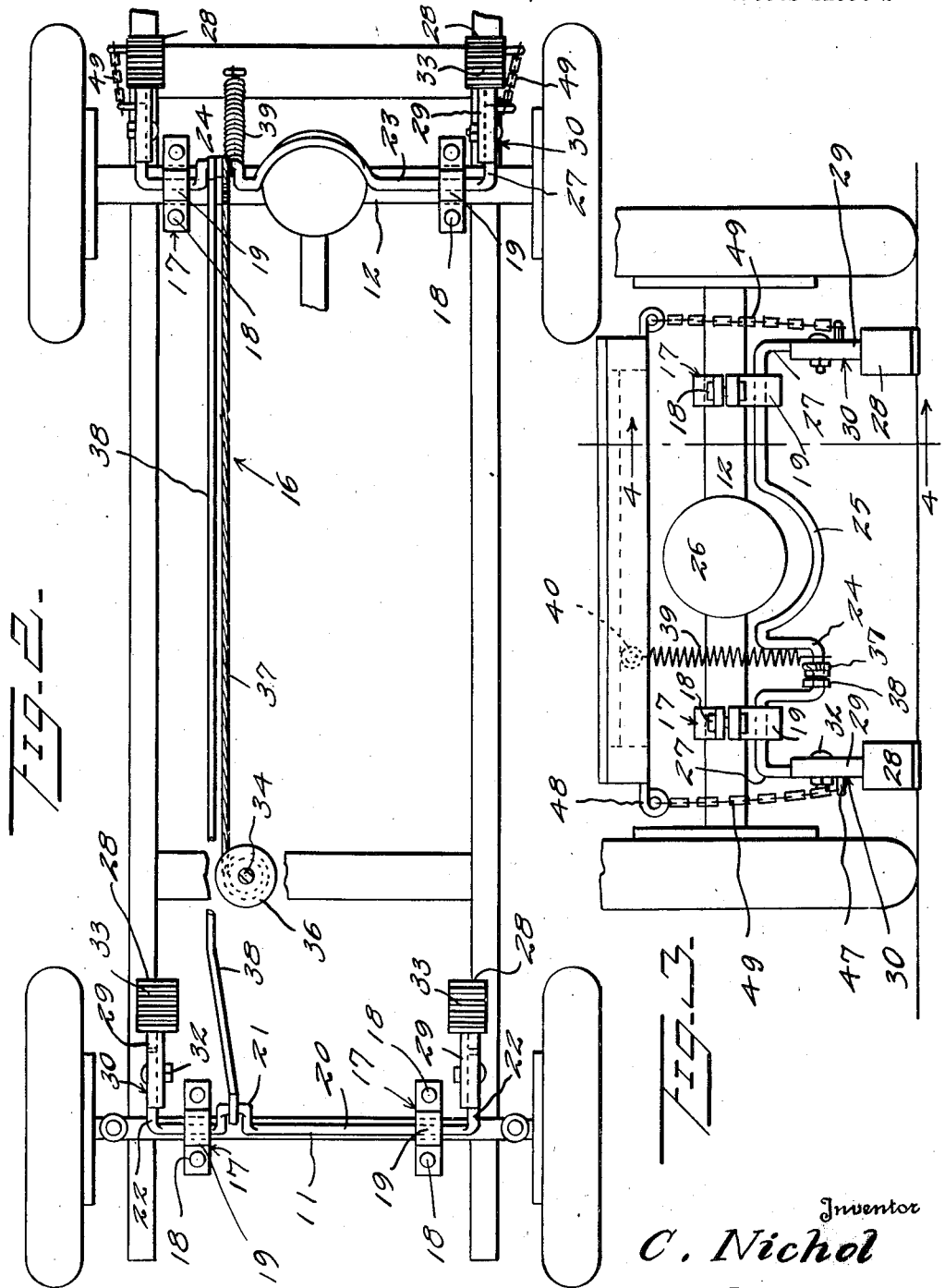
Inventor
C. Nichol
By
Attorney

Patented May 5, 1942

2,282,202

UNITED STATES PATENT OFFICE 2,282,202

GROUND ENGAGING VEHICLE BRAKE

Clinton Nichol, Morrison, Okla.

Application December 4, 1941, Serial No. 421,676

6 Claims. (Cl. 188—5)

This invention relates to a novel brake attachment for land vehicles, and more particularly to a novel construction of ground engaging brake for use on motor vehicles as an auxiliary brake.

More particularly, it is an aim of the invention to provide a brake adapted to be used to prevent skidding of a motor vehicle, and which will operate effectively to prevent a vehicle from skidding in a forward direction or laterally.

Still a further aim of the invention is to provide a vehicle brake which may be used to hold a vehicle while parked or stopped on a steep incline.

Other objects and advantages of the invention will hereinafter become more fully apparent from the following description of the drawings, which illustrate a preferred embodiment thereof, and wherein:

Figure 1 is a side elevational view showing the brake attachment applied to a conventional motor vehicle, which is shown partly in side elevation and partly in section, to fully illustrate the application of the brake attachment, Figure 2 is a bottom plan view showing the invention applied and in a retracted position, Figure 3 is an end view in elevation of the brake attachment, looking toward the rear end of the motor vehicle, and showing the brake shoes in ground engaging positions, Figure 4 is a sectional view of a part of the brake attachment, taken substantially along a plane indicated by the line 4—4 of Figure 3, and showing one of the brake shoes in side elevation and in a fully applied position; and Figure 5 is a detail sectional view taken substantially along the plane of the line 5—5 of Figure 1.

Referring more particularly to the drawings, wherein like reference characters designate like or corresponding parts throughout the different views, 10 designates generally a conventional motor vehicle having a front axle or axle housing 11 and a rear axle or axle housing 12, an operator's seat 13, a steering wheel 14, and a floor board 15. These parts, previously referred to, of the motor vehicle 10 are illustrated and described merely to better illustrate the application of the ground engaging brake attachment, designated generally 16 and comprising the invention, and which will hereinafter be described.

The brake attachment 16 includes pairs of clamps 17 including fastenings 18 by means of which the clamps 17 are detachably mounted on the axles or axle housings 11 and 12. A pair of the clamps 17 are mounted on each of the axles or axle housings 11 and 12, and each of the clamps 17 is provided with a depending bearing portion 19.

A shaft 20 is disposed beneath the axle 11 and is journaled, intermediate of its ends, in the bearings 19 which form parts of the clamps 17 attached to the axle 11. Between the said bearings 19, the shaft 20 is provided with a crank portion 21 and beyond said bearings 19, the ends of the shaft 20 are bent to provide angularly projecting substantially parallel portions 22.

A shaft 23 is disposed beneath the rear axle housing 12 and is journaled intermediate of its ends in the bearings 19 of the clamps 17 which are attached thereto. The shaft 23 is provided with a crank portion 24 which is disposed between said last mentioned bearings 19 and in longitudinal alinement with the crank 21. The shaft 23 is also provided with an outwardly bowed arcuately shaped portion 25 which is disposed around and spaced from the differential 26 of the rear axle housing 12. The ends of the shaft 23, beyond the last mentioned bearings 19, are bent to form angular portions 27 corresponding to the portions 22.

The brake attachment 16 includes four corresponding brake shoes 28 from the upper end of each of which projects an elongated socket 29 having a transverse opening, not shown, for a purpose which will hereinafter be described. Each of the sockets 29 is adapted to loosely engage over an angular portion 22 or 27 to combine therewith to form a telescoping standard, designated generally 30, of a brake shoe 28. The angular portions 22 and 27 are provided with a plurality of longitudinally spaced openings 31, which are adapted to be selectively alined with the openings, not shown, of the sockets 29 for receiving nut and bolt fastenings 32 for holding the standards 30 in adjusted positions. It will thus be seen that the standards 30 may be readily adjusted in length.

The brake shoes 28 are each provided with an outwardly bowed forward and under part 33 which is provided with transverse ribs or serrations, as clearly illustrated in Figures 1, 2 and 4, and which forms the ground engaging portion of the brake shoe.

Referring to Figure 1, a shaft 34 is journaled in the frame of the motor vehicle 10 and is disposed in an upright position and has its upper end projecting upwardly through the floor board 15. A crank 35 is keyed to the upper end of the shaft 34 and is disposed adjacent the steering wheel 14 so that the operator of the motor vehicle 10 can grasp the handle of the crank 35 to turn the shaft 34, for a purpose which will hereinafter become apparent. A reel or windlass 36 is keyed to the lower end of the shaft 34 and is disposed below the floor board 15. A cable 37 has one end secured to and wound one or more times on the reel 36. The opposite end of the cable 37 is attached to the crank 24. A link or connecting rod 38 is pivotally connected at one end to the crank 24 and at its opposite end to the crank 21 to cause said cranks to swing as a unit to thereby cause the shafts 20 and 23 to be rotated in unison in the same direction.

A contractile coil spring 39 is attached at one end thereof by means of an eye 40 to the vehicle 10, adjacent the rear end thereof, and rearwardly of the axle housing 12. The opposite end of the spring 39 is connected to the crank 24, as best seen in Figure 3. The spring 39 is arranged to pull the cranks 21 and 24 rearwardly to thereby urge the brake shoes 28 rearwardly and upwardly to raised, inoperative positions, as illustrated in Figures 1 and 2.

By manually turning the crank 35 in a clockwise direction, the cable 37 will be wound onto the reel 36 to thereby swing the cranks 21 and 24 forwardly to cause the shafts 20 and 23 to be turned in clockwise directions, as seen in Figure 1, to swing the brake shoes 28 forwardly and downwardly to cause their ground engaging serrated portions 33 to contact the surface 41 over which the wheels of the vehicle 10 are moving to stop the vehicle. It will be obvious that the rounded ground engaging surfaces 33 are so shaped that various portions thereof will engage the surface 41 from the time that the shoes 28 initially engage the surface 41, as illustrated in Figure 3, until the shoes are moved to fully lowered positions, as seen in Figure 4, in which latter positions the wheels of the vehicle 10 will be elevated out of engagement with the surface 41.

A ratchet wheel 42 is keyed to the shaft 34 and disposed above and adjacent the floor board 15 and a dog 43 is pivotally connected intermediate of its ends on a stud 44 which projects upwardly from the floor board 15 and is disposed so that its hooked end 45 can engage the teeth of the ratchet wheel 42 for preventing the shaft 34 from turning in a counterclockwise direction when the dog 43 is in a projected position. The dog 43 is provided with an upstanding lug 46 at its opposite end and is adapted to be operated by the foot of the operator of the vehicle 10 for releasing the ratchet wheel 42 so that the spring 39 can raise the shoes 28 and in so doing will unwind the cable 37 from the reel 36 and turn the shaft 34 in a counterclockwise direction. By means of the dog and ratchet wheel shown in Figure 5, it will be readily apparent that the brake 16 can be set in an applied position to function as a parking brake.

The sockets 29 of the rear brake shoes 28 are provided with rearwardly extending eyelets 47 and the rear portion of the vehicle 10 is provided with depending eyelets 48. Chains 49 are attached at their ends to the adjacent eyelets 47 and 48 and are of sufficient length to permit the brake shoes 28 to swing downwardly to the positions, as seen in Figure 4, but to prevent the brake shoes from swinging to positions beneath the axles 11 and 12 to prevent any possibility of the brake shoes swinging to positions where they could not readily be released by the operation of the spring 39.

It will be readily apparent that when the brake shoes 28 are in contact with the ground and while the wheels of the vehicle are also in contact with the ground said shoes will efficiently function to stop the forward or backward motion of the vehicle on a dry or slippery surface 41 and also to prevent sidewise skidding of the vehicle 10. Likewise, the arcuately bowed ground engaging surfaces 33 are shaped so that they will readily ride over ruts or humps, not shown, on a roadway or surface 41 so that such irregularities will not form obstructions that might damage the brake shoes. When the brake shoes 28 are in fully applied positions, as seen in Figure 4, the ground wheels of the vehicle 10 will be elevated off of the surface 41 and in this position the brake attachment 16 can be used for supporting the vehicle while a tire is changed or a wheel is replaced, and in this position the brake attachment 16 will function effectively to prevent the vehicle 10 from coasting either forwardly or rearwardly down a steep incline where the conventional vehicle brakes are insufficient for this purpose.

It will be obvious that the standards 30 may be adjusted in length to accommodate the brake attachment 16 to axles which set at different elevations and to adjustably position the shoes 28 relatively to the axles of the vehicle so that the ground engaging surfaces 33 will properly contact the ground, when applied.

Various modifications and changes are contemplated and may obviously be resorted to as only a preferred embodiment of the invention has been disclosed.

I claim as my invention:

1. A brake attachment for wheeled vehicles comprising clamps connected to the front and rear axles of a wheeled vehicle and provided with depending bearing portions, a shaft disposed beneath each of the axles and journaled in the bearing portions of the clamps attached thereto, said shafts having angularly projecting substantially parallel ends, ground engaging brake shoes provided with projecting, elongated sockets, each of said sockets engaging over an angular end of one of said shafts to combine therewith to form a telescoping standard, means for securing said sockets in adjusted positions relatively to said shaft ends, the intermediate portions of said shafts being provided with crank portions, a link connecting the crank portions of said shafts, and manually operative means connected to the crank portion of one of said shafts for turning the shafts to move the brake shoes into engagement with the ground.

2. A device as in claim 1, comprising contractile spring means connected to one of said cranks and to the motor vehicle for normally holding the brake shoes in raised, inoperative positions.

3. A device as in claim 1, each of said brake shoes having an elongated outwardly bowed forward and lower portion, said forward and lower portion being serrated and being arranged for engagement with the ground when the shoe is in an operative position.

4. A device as in claim 1, comprising chains connected to certain of said sockets and to the motor vehicle for limiting the downward swinging movement of the brake shoes, said chains being of such a length as to prevent the standards from moving into upright positions to thereby prevent the standards from passing below the dead centers of the axles, beneath which they are mounted.

5. A device as in claim 1, said manually operative means including an upright shaft journaled in the motor vehicle and having one end disposed adjacent the operator's seat thereof, a crank connected to said end for revolving said last mentioned shaft, a reel connected to the lower end of said shaft, a cable having one end wound on the reel, the opposite end of said cable being connected to the crank of one of said first mentioned shafts, for moving said first mentioned shafts in a direction for swinging the shoes downwardly, a ratchet wheel keyed to said last mentioned shaft, and a foot operated dog pivotally mounted adjacent the ratchet wheel for engaging the teeth thereof to prevent said last mentioned shaft from turning in a direction to allow the brake shoes to be swung upwardly, except when the dog is moved to a released position.

6. A brake attachment for wheeled vehicles comprising bearing members connected to and depending from the front and rear axles of a wheeled vehicle, a shaft disposed beneath each of the axles and journaled in the bearing members connected thereto, said shafts having angularly projecting substantially parallel ends, ground engaging brake shoes provided with projecting, elongated sockets, each of said sockets engaging over an angular end of one of said shafts to combine therewith to form a telescoping standard, means for securing the sockets in adjusted positions relatively to the shaft ends, link means connecting the shafts to cause the angular ends thereof to swing as a unit, and manually operative means connected to one of the shafts for turning the shafts to move the brake shoes into engagement with the ground.

CLINTON NICHOL.